United States Patent
Camp, Jr.

(10) Patent No.: US 8,782,177 B2
(45) Date of Patent: Jul. 15, 2014

(54) WIRELESS COMMUNICATIONS TO RECEIVER DEVICES USING CONTROL TERMINAL COMMUNICATION LINK SET-UP

(75) Inventor: William O. Camp, Jr., Chapel Hill, NC (US)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 3226 days.

(21) Appl. No.: 11/093,406

(22) Filed: Mar. 30, 2005

(65) Prior Publication Data
US 2006/0224701 A1    Oct. 5, 2006

(51) Int. Cl.
G06F 15/177 (2006.01)
(52) U.S. Cl.
USPC .......................................................... 709/220
(58) Field of Classification Search
USPC ................................... 455/456; 709/230, 217
See application file for complete search history.

(56) References Cited

U.S. PATENT DOCUMENTS

| | | | |
|---|---|---|---|
| 2002/0046084 A1 | 4/2002 | Steele et al. | |
| 2003/0119527 A1* | 6/2003 | Labun et al. | 455/456 |
| 2003/0172163 A1* | 9/2003 | Fujita et al. | 709/226 |
| 2003/0208617 A1* | 11/2003 | Yanagisawa et al. | 709/238 |
| 2004/0059825 A1* | 3/2004 | Edwards et al. | 709/230 |
| 2004/0093375 A1 | 5/2004 | Mason et al. | |
| 2004/0205233 A1* | 10/2004 | Dunk | 709/238 |
| 2005/0060754 A1 | 3/2005 | Simyon | |

OTHER PUBLICATIONS

International Search Report and Written Opinion of the International Searching Authority for International Patent Application No. PCT/US2005/037206 mailed on Mar. 6, 2006.

* cited by examiner

*Primary Examiner* — Jerry Dennison
(74) *Attorney, Agent, or Firm* — Myers Bigel Sibley & Sajovec, PA

(57) ABSTRACT

Methods of delivering electronic content include exchanging communications with a network access point from a control terminal to establish a communication link configured for two-way communications. Electronic content transmitted by the network access point is received at a remote terminal over the established communication link without providing responsive communications to the network access point from the remote terminal.

30 Claims, 7 Drawing Sheets

WIRELESS COMMUNICATIONS TO RECEIVER DEVICES USING CONTROL TERMINAL COMMUNICATION LINK SET-UP

BACKGROUND OF THE INVENTION

The present invention relates to communication systems, methods and computer program products and, more particularly, to apparatus, methods and program products for set-up of communications.

Recent years have seen the development of a wide variety of forms for on-demand delivery of news, music, movies, and other content. Such content is now available over a plethora of channels, including those offered by satellite and cable television and radio services and those provided over the World Wide Web.

Various such electronic content may be delivered over a wireless communication link to portable devices, which are often battery powered. A variety of different approaches for delivering such electronic content to a wireless device are also known. For example, satellite radio services may provide a variety of radio entertainment channels broadcast from a satellite transmitter. Users may purchase a battery or line powered receiver device that may be tuned by a user to select one of the available entertainment channels. A satellite radio receiver typically may be a receiver only device that may be tuned by a user to a selected channel without the need for communications to the satellite to establish a communication link for the selected channel to the receiver.

It is also known to communicate electronic content over a two-way communications link based on a variety of different wireless communication protocols. For example, a variety of wide area cellular networks are in use based on protocols such as code division multiple access (CDMA), the Global System for Mobile communications (GSM) and the like. Local area wireless networks are known using, for example, the Institute for Electrical and Electronic Engineers (IEEE) 802.11 standard for wireless communication. These two-way communications links may provide access to content using, for example, the Wireless Access Protocol (WAP), similar to the range of electronic content available from computer devices over the World Wide Web. Such two-way communication link protocols typically require an exchange of communications between a network access point and the portable wireless device to set up and/or break down the communication link. Similarly, communications from the portable device to the access point may also be required during transmission of the electronic content to maintain the link. For example, confirmation of receipt of packets may be expected from the portable device.

However, for a variety of devices that may desire to receive electronic content over such two-way communication links, power consumption may be an important factor, as such devices may be operating on battery power. As these devices are often small, there may be only limited space available for a battery, thus leading to smaller batteries and even greater concern with power consumption. In addition, additional hardware and costs associated therewith may be required to support two-way communications, as contrasted with one-way receive-only communications. Even where a user only desires to receive electronic content, the protocols associated with set-up, maintenance and breakdown of a two-way communication link typically require at least some communications from the receiving device to a transmitter providing the electronic content. Such additional hardware, such as a transmitter, a power amplifier, and/or digital signal processing circuitry or other processing logic associated with implementing a two-way communication link, may increase not only the power consumption and cost, but also the size of such devices.

SUMMARY OF THE INVENTION

In some embodiments of the present invention, methods of delivering electronic content include exchanging communications with a network access point from a control terminal to establish a communication link configured for two-way communications. Electronic content transmitted by the network access point is received at a remote terminal over the established communication link without providing responsive communications to the network access point from the remote terminal. The network access point may be, for example, a wireless local network access point, such as a WiFfi standard server. Configuration information may be provided from the control terminal to the remote terminal to configure the remote terminal to receive the electronic content transmitted by the network access point.

In other embodiments of the present invention, providing configuration information includes providing a media access control (MAC) address and/or internet protocol (IP) address associated with the electronic content to the remote terminal from the control terminal. The MAC address and/or IP address may also be provided from the control terminal to the network access point to be associated with the electronic content. Providing configuration information may further include providing a sub-address associated with the electronic content that will be embedded in the electronic content to the remote terminal from the control terminal.

In yet other embodiments of the present invention, providing configuration information includes transmitting the configuration information from the control terminal to the network access point using the established communication link. The configuration information may be included in data transmitted from the control terminal to the network access point. The configuration information may be preceded in the data transmitted from the control terminal by a predefined data pattern recognizable by the remote terminal In further embodiments of the present invention, communications having data and a header including a MAC and/or IP address are received over the establish communication link at the remote terminal. The remote terminal determines if the received MAC and/or IP address corresponds to the MAC address associated with desired electronic content and determines if the data includes the sub-address associated with the electronic content if the received MAC and/or IP address corresponds to the MAC address associated with the electronic content. The received communications are provided to a content user communicatively coupled to the remote terminal if the data includes the sub-address associated with the electronic content and if the received MAC and/or IP address corresponds to the MAC address associated with the electronic content.

In other embodiments of the present invention, the remote terminal includes a MAC layer having a reduced functionality relative to a standard MAC layer associated with establishing the communication link. The remote terminal may be configured to receive communications from the control terminal having a non-standard communication protocol not provided by a standard used for the established communication link. Providing control information from the control terminal may include providing the control information using the non-standard communication protocol. Providing control information using the non-standard communication protocol may include transmitting the MAC address and/or IP address preceded by a predefined data pattern not appearing in the electronic content.

In yet further embodiments of the present invention, responsive communications are provided from the control terminal to the network access point to maintain the established communication link. An identification of a desired electronic content for transmission over the established link may be provided to the network access point from the control terminal. Control information may be received from a user at the control terminal and the control information may be used to establish the communication link.

In other embodiments of the present invention, the electronic content is received at the control terminal and the received content is provided from the control terminal to a user from the control terminal. The remote terminal may be a plurality of remote terminals. Providing configuration information may include providing a common media access control (MAC) address and/or internet protocol (IP) address associated with the electronic content to the plurality of remote terminals from the control terminal and providing a sub-address associated with the electronic content that will be embedded in the electronic content to the plurality of remote terminals from the control terminal, wherein at least one of the remote terminals is provided a sub-address different from another of the remote terminals to provide different electronic content to ones of the remote terminals.

In further embodiments of the present invention, the remote terminal is a two-way communication device including a receiver and a transmitter and the method further includes establishing a two-way communication link between the remote terminal and at least one of the control terminal and/or the network access point and utilizing the established two-way communication link from the remote terminal to provide a designation of desired electronic content. In some embodiments, the method further includes establishing a two-way communication link from the remote terminal to a content server through the network access point without use of the control terminal.

In yet other embodiments of the present invention, methods of delivering electronic content include exchanging communications with a wireless local network access point from a control terminal to establish a communication link configured for two-way communications. Configuration information is provided from the control terminal to a remote terminal to configure the remote terminal to receive electronic content transmitted by the network access point over the established communication link without providing responsive communications to the network access point from the remote terminal.

Providing configuration information may include providing a media access control (MAC) address and/or internet protocol (IP) address associated with the electronic content to the remote terminal from the control terminal and may further include providing a sub-address associated with the electronic content that will be embedded in the electronic content to the remote terminal from the control terminal. Responsive communications may be provided from the control terminal to the network access point to maintain the established communication link.

While described above primarily with reference to method aspects, it will be understood that the present invention also includes apparatus and computer program products for delivering electronic content.

DETAILED DESCRIPTION OF EXEMPLARY EMBODIMENTS

Figure 1:
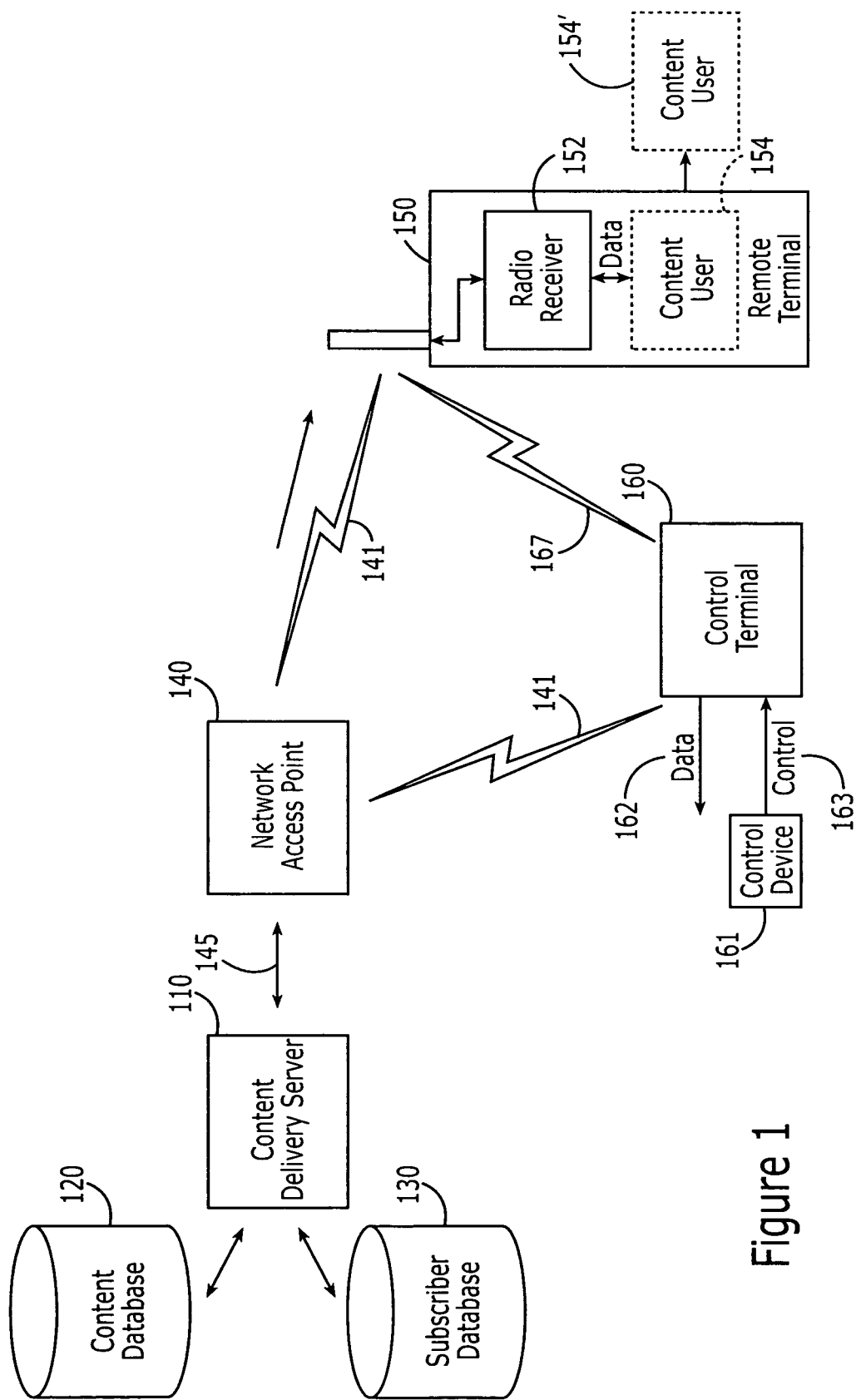
FIG. 1 is a block diagram illustrating electronic content delivery apparatus according to some embodiments of the present invention.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, a "remote terminal" includes both devices having only a wireless signal receiver without transmit abilities and devices having both receive and transmit hardware capable of two-way communication over a two-way communication link. Such devices may include cellular or other communications devices with or without a multi-line display; Personal Communications System (PCS) terminals that may combine a voice and data processing, facsimile and/or data communications capabilities; Personal Digital Assistants (PDA) that can include a radio frequency receiver and a pager, Internet/Intranet access, Web browser, organizer, calendar and/or a global positioning system (GPS) receiver; and/or conventional laptop and/or palmtop computers or other appliances, which include a radio frequency receiver. As used herein, "remote terminal" also includes "mobile terminals" that may be portable, transportable, installed in a vehicle (aeronautical, maritime, or land-based), or situated and/or configured to operate locally and/or in a distributed fashion at any other location(s) on earth and/or in space, as well as terminals designed for operation from a fixed location. A remote terminal may also include or be communicatively coupled to an output device, such as an audio headset or a display.

FIG. 1 illustrates a system for delivering electronic content items, such as text articles, audio files, video files and the like, over a two-way communication link to devices operating as receivers for a one-way communication link according to some embodiments of the present invention. A content delivery server 110 is operatively associated with a content database 120 and a subscriber database 130. The content database 120 stores, for example, text files, audio files, video files and other electronic content items for retrieval by the content delivery server 110. Some embodiments may also include a subscriber database 130 that stores information related to subscribers to the service provided, offered or otherwise supported by the content delivery server 110 and may be used, for example, in authentication and information routing functions.

The content delivery server 110 is also operatively associated with a network access point 140, which is configured to transmit a wireless communication signal over a communication link 141 configured for two-way communications (referred to herein as a two-way communication link), the communication signal including electronic content data 145 provided by the server 110. For example, the network access point 140 may be a base station (terrestrial or satellite) of a wide area cellular communication network, a WiFi server or the like. As used herein, "WiFi" refers to a variety of local area wireless networks, including those operating according to a protocol defined by one of more of the Institute for Electrical and Electronic Engineers (IEEE) 802.11 et al. standards.

A remote terminal 150 includes a radio receiver 152 configured to receive the electronic content over the communication link 141. As will be described further herein, the remote terminal 150 in some embodiments of the present invention is configured to receive electronic content transmitted by the network access point 140 over the communication link 141 without providing responsive communications to the network access point 140 from the remote terminal 150.

In various embodiments of the present invention, the remote terminal may include a content user 154 and/or the content user 154' may be a separate device coupled to the remote terminal 150 by wire or wireless connection configured to transfer the electronic content to the content user 154, 154'. For example, the content user 154, 154' may be an audio output device that is configured to play audio segments to a user. The content user 154, 154' may also be configured to accept user inputs that may, for example, select electronic content or, in some embodiments of the present invention, be utilized in two-way communications where the remote terminal 150 includes a transmitter as well as the receiver 152. The user input may be provided in a number of different ways, such as by a keyboard input or voice command.

As also shown in the embodiments of FIG. 1, a control terminal 160 may also communicate over the communication link 141 with the network access point 140. In some embodiments of the present invention, the control terminal 160 is configured to exchange communications with the network access point 140 to establish the communication link 141 configured for two-way communication that will be utilized by the remote terminal 150 for receiving electronic content in a one-way communication mode of the remote terminal 150. The control terminal 160 may also be configured to provide control information to the remote terminal 150 over a communication link, such as the illustrated wireless link 167.

The control terminal 160 may set up, maintain and/or breakdown the communication link 141 and/or provide configuration information over the link 167 based on control information 163 received from a control user through the control device 161. In addition, the control terminal 160 may be configured to receive the electronic content data 162 and either discard or provide the data 162 to a user at the control terminal 160.

It will be appreciated that the system of FIG. 1 may be implemented in a variety of different ways. For example, the server 110 may include one or more computers configured with various application programs configured to manage the content and subscriber databases 123, 130 and to communicate with the radio transmitter 140. The content database 120 may be constructed using any of a variety of different techniques, e.g., by downloading publicly available information from various media websites. Similarly, the subscriber database 130 may be constructed in a number of different ways, such as by interactive sessions with subscribers via a communications network. The network access point 140 may include a discrete unit and/or may be provided in the form of a node of a distributed radio communications system, such as a base station of a public or private cellular network. The radio receiver 152 may be limited to radio receiver functions or may be part of a transceiver configured for bidirectional radio communications.

In various embodiments of the present invention, the content delivery server 110 may be connected over a wired connection to the content database 120, the subscriber database 130 and the network access point 140. Both data and control information may flow between the network access point 140 and the content delivery server 110. The communication link 141 may also be configured to transmit both control and data information to the control terminal 160 and/or remote terminal 150. Similarly, control information may be provided from the control terminal 160 to the remote terminal 150 over the communication link 167. The external content user 154' may also be connected by wire to the remote terminal 150 and the control device 161 may be connected by wire to the control terminal 160.

As described with reference to the embodiments of FIG. 1, a simplified one-way communication link utilizing a two-way communication protocol may be provided by, essentially, deceiving the network access point 140 into believing that it is talking to a full function transceiver (transmitter and receiver) when it is essentially operating to send data on a one-way trip to the remote terminal 150. This utilization of the two-way link without modification of the protocol of the two way link may be provided using a transceiver in the control terminal 160 to communicate with the network access point 140 so as to start the link and, where needed, respond with acknowledgements as required to keep the link running from the network access point 140 to a target remote terminal 150. Note that, while only a single target remote terminal 150 is shown in the embodiments of FIG. 1, a plurality of remote terminals may be serviced by the control terminal 160 and/or a plurality of control terminals 160 may be in communication with the network access point 140, each of which may serve one or more remote terminals.

The arrangement illustrated in the embodiments of FIG. 1 may provide for wireless communication of electronic content through the access point 140 to a remote terminal 150 including only a receiver. The data received at the remote terminal 150 as electronic content may then be communicated, for example, by wire, to a content user 154, 154'. The content user 154, 154' could be, for example, an audio, visual or audio and visual transducer or display, for example, a headset. As such, lower battery drain in the remote terminal 150 may be provided by using only a receiver and, in addition, lower costs and complexity of the remote terminal may be provided even where power consumption at the remote terminal 150 is not an issue. In contrast, the control terminal 160 may contain full transmitter and receiver functionality to support communications with the network access point 140, including the exchange of control information towards the network access point 140 to set up, maintain and/or breakdown the two-way communication link 141.

As noted above, the control data used in these operations may come from a connected control device 161, such as a keypad, display, audio command input circuit, or the like. As also noted, electronic content data coming from the network access point 140 to the control terminal 160 may be discarded as the real target for the electronic content data is the remote terminal 150 and the associated content user device 154, 154'. However, an operator of the control terminal 160 may maintain the data, for example, to monitor data going to the remote device 150 where it is located at a distance from the operator of the control terminal (as contrasted with a configuration in which the remote terminal is a device, such as a headset, being used by the operator of the control terminal 160 where it is unlikely that there would be any benefit to providing the same operator the information content twice).

As also discussed above, the network access point 140 may be a variety of different protocol two-way communication devices in various embodiments of the present invention, such as wireless local area network (WLAN), also referred to as "WiFi" herein. The network access point 140 may also be a Bluetooth, Ultra-wideband (UWB) device or the like. The communication link 141 between the network access point 140 and the control terminal 160 may be established by the control terminal 160 contacting the network access point 140 in the conventional manner defined by the protocol utilized by the network access point 140. In addition to establishing a communication link 141, the setup communications may also include a communication from a control terminal 160 to the network access point 140 selecting the electronic content to be returned to the remote terminal 150. The network access point 140 may then provide such information to the content delivery server 110 to establish the flow of electronic content from the content delivery server 110 through the network access point 140.

Figure 2:
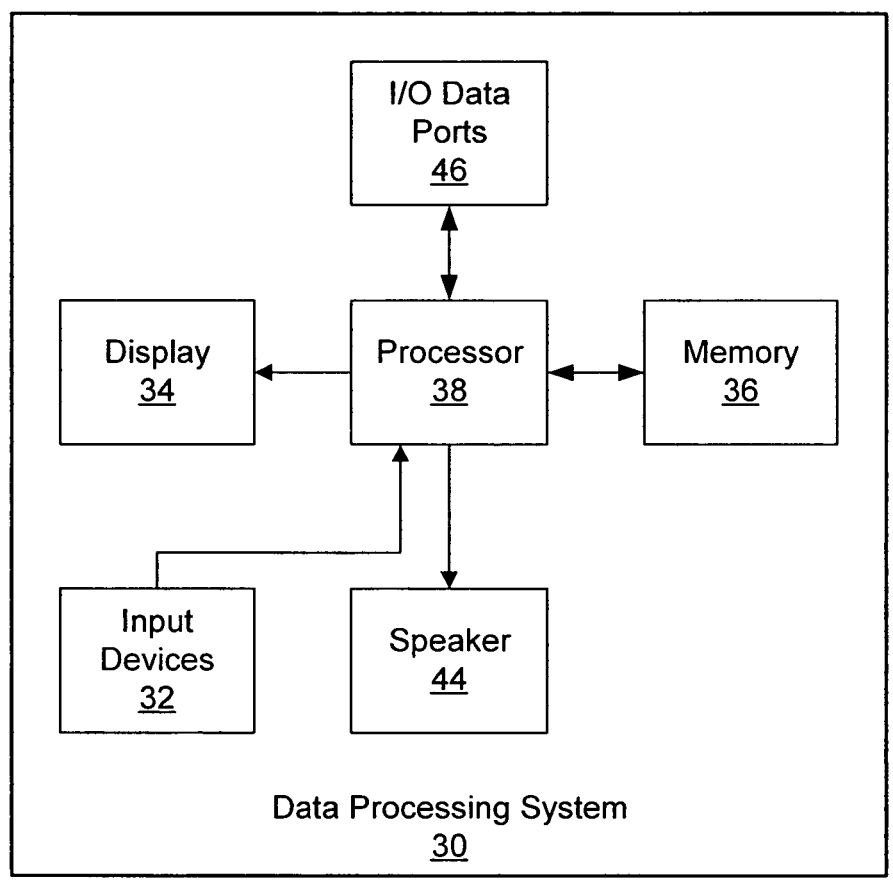
FIG. 2 is a block diagram of a data processing system suitable for use as a control terminal according to some embodiments of the present invention.

Referring now to FIG. 2, a block diagram of data processing systems suitable for use as a control terminal according to some embodiments of the present invention will be discussed. As illustrated in FIG. 2, an exemplary embodiment of a data processing system 30 typically includes input device(s) 32, such as a keyboard or keypad, a display 34, and a memory 36 that communicate with a processor 38. The data processing system 30 may further include a speaker 44, and an I/O data port(s) 46 that also communicate with the processor 38. The I/O data ports 46 can be used to transfer information between the data processing system 30 and another computer system or a network. For example, the I/O data ports 46 may support wireless communications based on a variety of wide area or local network wireless protocols such as those utilized for the communication link 141 and/or the communication link 167 shown in FIG. 1 These components may be conventional components, such as those used in many conventional data processing systems, which may be configured to operate as described herein.

Figure 3:
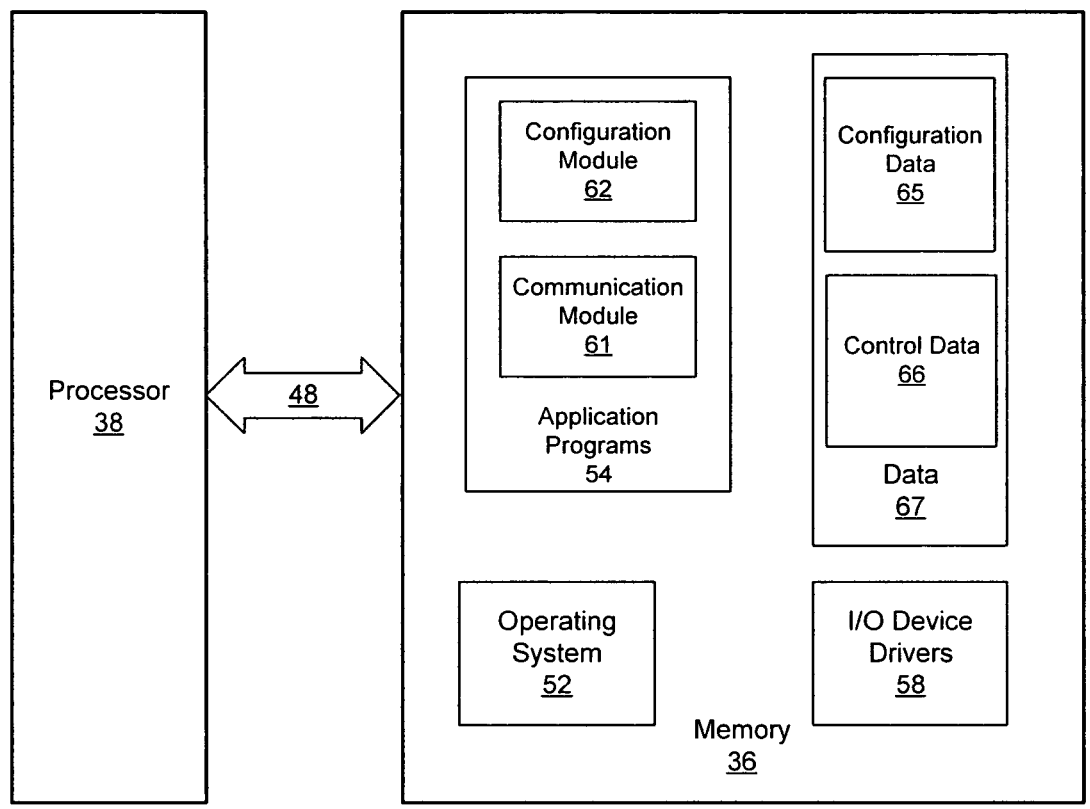
FIG. 3 is a block diagram of a data processing system implementing a control terminal according to some embodiments of the present invention.

FIG. 3 is a block diagram of data processing systems that illustrate systems, methods, and/or computer program products in accordance with some embodiments of the present invention. The processor 38 communicates with the memory 36 via an address/data bus 48. The processor 38 can be any commercially available or custom processor, such as a microprocessor. The memory 36 is representative of the overall hierarchy of memory devices containing the software and data used to implement the functionality of the data processing system 30. The memory 36 can include, but is not limited to, the following types of devices: cache, ROM, PROM, EPROM, EEPROM, flash memory, SRAM and/or DRAM.

As shown in FIG. 3, the memory 36 may include several categories of software and data used in the data processing system 30: the operating system 52; the application programs 54; the input/output (I/O) device drivers 58; and the data 67. As will be appreciated by those of skill in the art, the operating system 52 may be any operating system suitable for use with a data processing system, such as OS/2, AIX or System390 from International Business Machines Corporation, Armonk, N.Y., Windows95, Windows98, Windows2000 or WindowsXP from Microsoft Corporation, Redmond, Wash., Unix or Linux. The I/O device drivers 58 typically include software routines accessed through the operating system 52 by the application programs 54 to communicate with devices such as the I/O data port(s) 46 and certain memory 36 components. The application programs 54 are illustrative of the programs that implement the various features of the data processing system 30. Finally, the data 67 represents the static and dynamic data used by the application programs 54, the operating system 52, the I/O device drivers 58, and other software programs that may reside in the memory 36.

As is further seen in FIG. 3, the application programs 54 may include a configuration module 62 and/or a communication module 61. The data portion 67 of memory 36, as shown in the embodiments illustrated in FIG. 3, may include configuration data 65 and/or control data 66. The communication module 61 may be configured to exchange communications with a wireless local network access point 140 from a control terminal 160 to establish a communication link configured for two-way communications. The configuration module 62 may be configured to provide configuration information from a control terminal 160 to a remote terminal 150 to configure the remote terminal 150 to receive electronic content transmitted by the network access point 140 over the established communication link without providing responsive communications to the network access point 140 from the remote terminal 150. The configuration data 65 may include a variety of configuration data for setting up the remote terminal or terminals 150, such as addressing information as will be discussed further with reference to various embodiments herein. The control data 66 may be configured to receive input control data from the control device 161 that may be utilized in setting up the communication link 141 to provide for delivery of electronic content to a remote terminal or terminals 150.

While embodiments of the present invention have been illustrated in FIG. 3 with reference to particular divisions between application programs, data and the like, the present invention should not be construed as limited to the configurations of FIG. 3 but is intended to encompass any configuration capable of carrying out the operations described herein. Furthermore the functionality described herein may be provided, for example by plug-ins or other ancillary code to provide functionality to existing applications.

Further embodiments of electronic content delivery apparatus according to embodiments of the present invention will now be described with reference to the block diagram illustrations of FIGS. 4 and 5. Note that like numbered blocks (i.e., 110, 410, 510 etc.) in FIGS. 4 and 5 generally operate as described with reference to the embodiments of FIG. 1 except as particularly described herein. Accordingly, aspects common to the various illustrations of the embodiments need not be described in further detail with reference to FIGS. 4 and 5.

Figure 4:
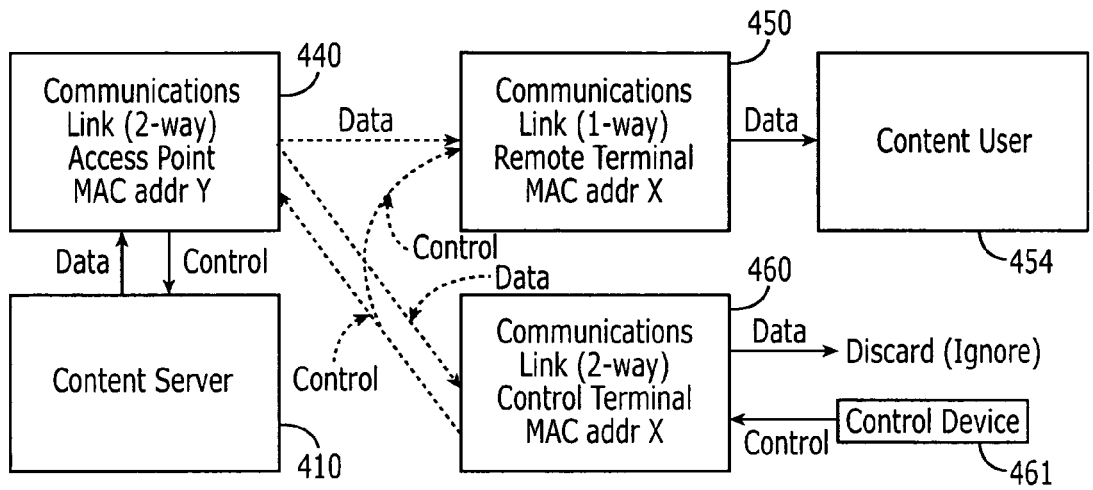
FIG. 4 is a block diagram illustrating electronic content delivery apparatus according to some embodiments of the present invention.

The embodiments illustrated in FIG. 4 show particular details of addressing operations related to delivery of electronic content from a content server 410 through an access point 440 to a remote terminal 450 for provision to a content user 454 utilizing a control terminal 460 receiving control information from a control device 461.

Figure 5:
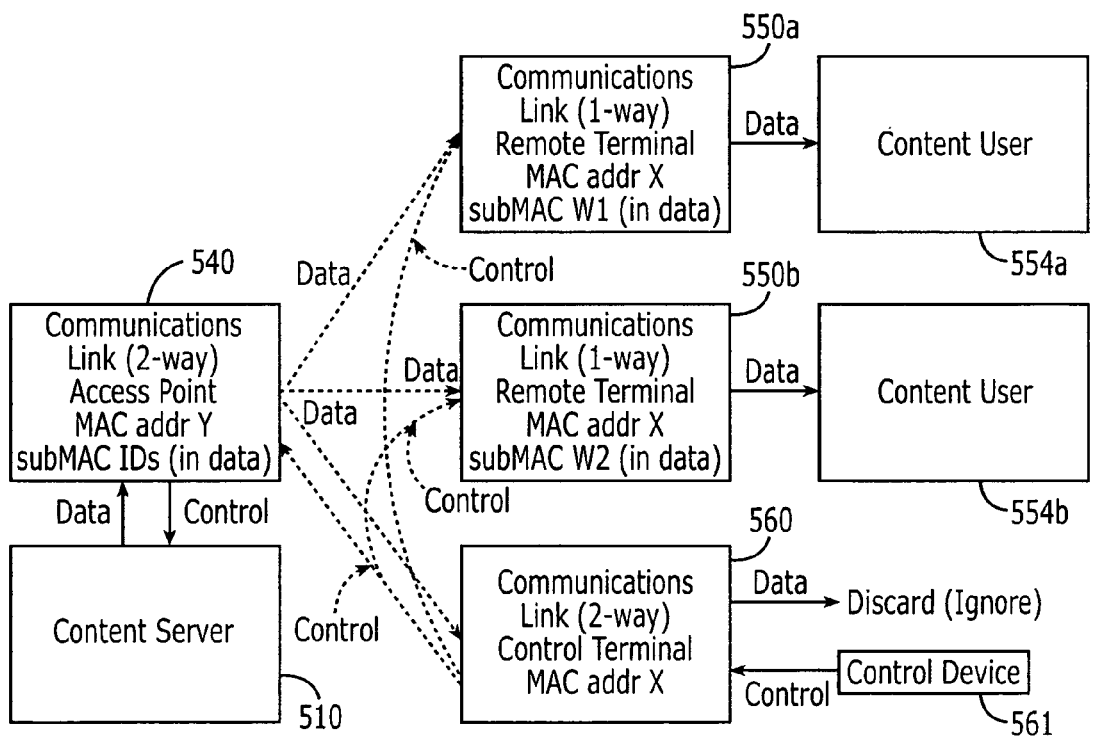
FIG. 5 is a block diagram illustrating electronic content delivery apparatus according to other embodiments of the present invention.
Figure 6:
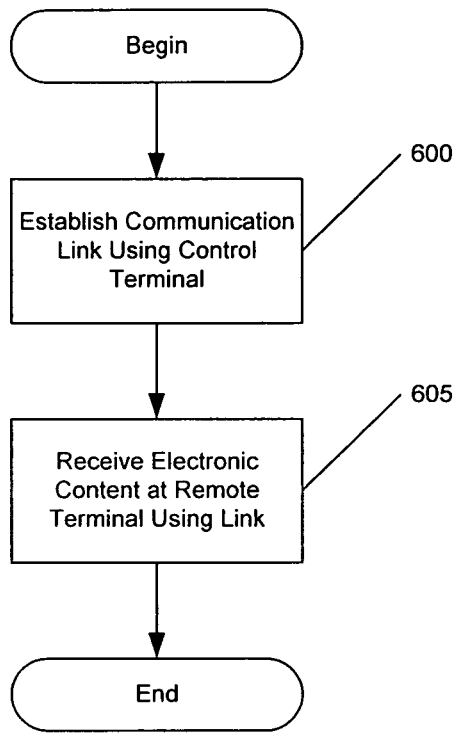
FIGS. 6 through 10 are flowcharts illustrating electronic content delivery operations according to various embodiments of the present invention.

For the embodiments shown in FIGS. 4 and 5, solid line connections may be wired connections although wireless interconnections may be utilized. Illustrated dotted lines show wireless interconnections. In particular, the wireless interconnections include data flow from the access point 440 to both the remote terminal 450 and the control terminal 460. Control information flow is shown from the control terminal 460 to the access point 440 and from the control terminal 460 to the remote terminal 450.

An addressing protocol illustrated in the embodiments of FIG. 4 may be utilized so that the receiver in the remote terminal 450 only passes desired electronic content to the content user 454 out of a variety of different data that might be transmitted and received from the access point 440. Thus, an addressing protocol is illustrated allowing the remote terminal 450 to filter a data stream and select only packets associated with the desired electronic content for provision to the content user 454. In particular, for the embodiments of FIG. 4, the filtering at the remote terminal 450 is based on an association of a specific MAC address in a data packet header carrying data associated with particular electronic content.

As shown in the embodiments of FIG. 4, the addressing information may be provided by having the control terminal 460 transmit the desired MAC address in the stream of data going towards the remote terminal 450 and/or the access point 440. The data stream from the control terminal 460 to the access point 440 may itself serve as a means of providing information, such as a desired MAC address, to the remote terminal 450 as the remote terminal 450 may listen to this uplink data stream as will be described further herein. The data may then be labeled and/or encoded at the access point 440 for transmission so that the receiver in the remote terminal 450 recognizes when a MAC address is received at the remote terminal 450 that is the relevant MAC address to select the desired packets from among a variety packets that may be received from the access point 440. For example, the MAC address may be included in the data packet header preceding the associated data. The remote terminal 450 may receive an identification of the relevant address for a particular electronic content in a variety of ways. In some embodiments, the relevant MAC address is wirelessly transmitted and is preceded in transmission to the remote terminal 450 with a unique pattern of ones and zeros that is unlikely to occur in real data flows (for example, three repetitions of a long Barker code). The scanning receiver in the remote terminal 450, upon seeing this unique signal, may then capture the associated relevant MAC address for subsequent use. More particularly, in the embodiments illustrated in the FIG. 4, the relevant (to a particular electronic content) MAC address is transmitted to the remote terminal 450 from the control terminal 460 as control data on a link, such as a communication link 167 (FIG. 1), using the unique data pattern to notify the remote terminal 450 that it is about to receive a MAC address for use in receiving electronic content. As such, the communication from the access point 440 may not require any such modification or unique data patterns as a standard packet format described by the two-way communication protocol serviced by the access point 440 may include a MAC address in a header of the data packets.

As noted above, the desired MAC address may also be obtained by the remote terminal 450 from listening to uplink communications from the control terminal 460 to the access point 440. For example, WiFi/Bluetooth local networks, which may be used for these communications, typically are time division duplex communication protocols using the same frequency for both uplink and downlink communications. Thus, the remote terminal could "listen": to uplink slots to receive the data being transmitted by the control terminal 460. An identifier could be included in the data portion of the uplink slots that would be recognized by the remote terminal 450 as indicating that data of use to the remote terminal 450 is to follow. The unique identifier may be, for example, a unique sequence of bits, such as a Barker code, as previously described for embodiments where communications from the control terminal 460 to the remote terminal 450 are not included in communications being transmitted to the access point 440. Thus, a MAC address and/or sub-address and/or the like may be provided from the control terminal 460 to the remote terminal 450 over the communication link 141 from the control terminal 460 to the access point 40. The access point 440 thus, may never need to recognize that it is being used in a broadcast/multi-cast type mode as all data is coming from the control terminal 460.

Thus, a desired MAC address (MACaddrXXX) may be provided from the control terminal 460 to the remote terminal 450 and also to the network access point 440 for use as a destination address in transmitting electronic content data to the remote terminal 450.

As also shown in FIG. 4, communications from the control terminal 460 to the access point 440 may also be based on the use of MAC address associated packets where the access point 440 has a MAC address (MACaddrY) different from that associated with the control terminal 460 (MACaddrX). However, both the remote terminal 450 and the control terminal 460 are shown as having the same MAC address (MACaddrX) so that the access point 440 need not even realize that there is a remote terminal 450 that is the target of the communications from the access point 440.

Additional information may also be provided to the remote terminal 450 from the control terminal 460, such as a radio frequency and/or time slot or the like that is being used by the access point 440 for its standard protocol two-way communications over the communication link 141 (FIG. 1). This secondary information, such as radio frequency, may be acquired, for example, by having the remote terminal 450 put into a scanning mode whereby various frequencies are repeatedly scanned until a unique signaling pattern, such as discussed above, is recognized, which may then switch the remote terminal 450 receiver operations to the desired receive mode with the provided MAC address value.

In some embodiments of the present invention, the control terminal 460 may be a cell phone and a home media server or personal computer may provide the content server 410 and/or the access point 440. The remote terminal 450 and content user 454 may be headphones, speakers, video displays, with or without audio, and the like. The content server 410 could also be, for example, a streaming source, such as the Internet or a cable service. In other embodiments of the present invention, the access point 440 may be a public WiFi access point, such as often found in coffee shops, bookstores or the like. The control terminal 460 may be a personal computer or the like operated by the business providing service through a WiFi access point 440. The remote terminal 450, in such embodiments, may be a variety of electronic devices having receive capability owned by individual customers and brought to the business location, such as cellphones, laptop computers, PDA's and/or the like. Thus, for example, a customer could utilize their cellphone, PDA and/or the like to listen to satellite radio broadcasts of music or the like routed through the access point 440 and transmitted utilizing a MAC address determined by the control terminal 460.

A customer entering the business premises covered by the network access point 440 could communicate with a control terminal 460 in a variety of manners to obtain addressing information, such as a MAC address, for the remote terminal device 450 of the customer to allow access to radio music or other electronic content. For example, the user's remote terminal device 450 may be a cell phone having two way communication capabilities and communicate by wireless or wired connection to the control terminal 460 to get any necessary control configuration information. The cell phone device may then be transitioned into a simplified receive only device configuration being used to play music or other electronic content for the customer.

As shown in the embodiments of FIG. 5, an access point 540 may be utilized to deliver electronic content from a content server 510 to a plurality of remote terminals 550a, 550b having associated content users 554a, 554b using a control terminal 560 that receives control information from a control device 561. As also shown in the embodiments of FIG. 5, a plurality of remote terminals 550a, 550b may be configured for one-way communications over a two-way communication link with links set up by the control terminal 560 and be provided distinct or identical electronic content.

As shown in FIG. 5, a secondary MAC address may be utilized to allow respective ones of the remote terminals 550a, 550b to obtain different electronic content, such as different radio station transmission. The secondary MAC address may be, for example, a sub-address that is contained in the data portion of packets communicated from the access point 540 rather than in the header of the data packets. A protocol for embedding the sub-addresses in the data may be provided at the access point 540 or directed by the control terminal 560 and the remote terminals 550a, 550b may be configured for decoding the sub-address contained in the data portion of received packets based on configuration information from the control terminal 560. This information on how to obtain the sub-address, as well as the assignment of the sub-address associated with the desired electronic content, may be provided to the remote terminal 550a, 550b by the control terminal 560 on activation of the remote terminals 550a, 550b.

In various embodiments of the present invention, the activation of the remote terminals 550a, 550b with MAC address values (and/or secondary MAC address values if desired) could be done in advance via an alternate path, for instance, an infrared (IR) link in close proximity to the control terminal 560 or a direct connection, such as a Universal Serial Bus (USB) connection. It may also be configured so that the remote terminal 550a, 550b provides some form of indication to a content user 554a, 554b that it is actively listening to a one-way communication signal transmitted over a two-way communication link from the access point 540. For example, a flashing LED light could be provided. A reset function may also be provided on the remote device 550a, 550b to transition the remote device 550a, 550b to a one-way communication mode.

The receiver in the remote terminal 550a, 550b may be a standard receiver but may also, in some embodiments of the present invention, be a lower performance receiver having reduced channel selectivity, reduced sensitivity or the like. Such configurations may, for example, reduce power drain on a battery of the remote terminal 550a, 550b and/or reduced cost thereof. Similarly, the MAC or other addressing layer in the remote terminal 550a, 550b may be a reduced function MAC or other addressing layer rather than the standard MAC or other addressing layer for the wireless standard associated with the access point 540. It may also be configured to recognize non-standard signaling communications from the control terminal 560, such as the transmissions described above for sending target MAC address and sub-MAC address information to the remote terminal 550a, 550b from the control terminal 560.

Operations for delivering electronic content to a remote terminal that may be a simple one-way receive-only device according to various embodiments of the present invention will now be described with reference to the flow chart illustration of FIGS. 6-10. Referring first to the embodiments illustrated in FIG. 6, communications are exchanged with a network access point from a control terminal to establish a communication link configured for two-way communications (Block 600). Electronic content transmitted by the network access point is received at a remote terminal over the established communication link (Block 605). The electronic content is received at the remote terminal without providing responsive communications to the network access point from the remote terminal. The network access point may be, for example, a wireless local network access point.

Figure 7:
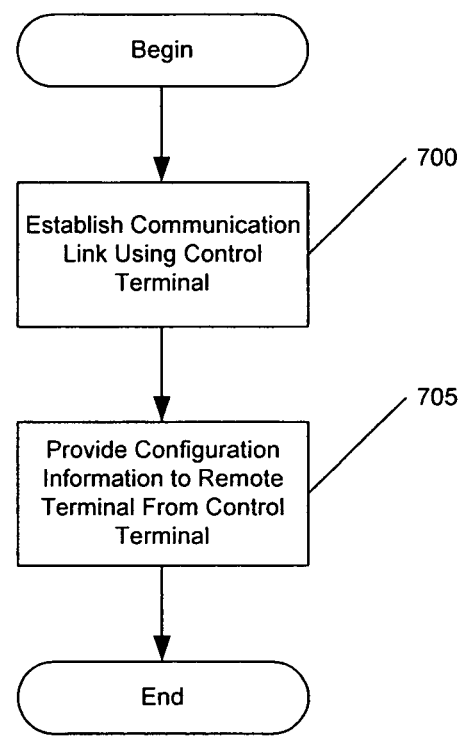

Further embodiments of the present invention are illustrated in FIG. 7. As shown in FIG. 7, communications are exchanged with a wireless local network access point from a control terminal to establish a communication link configured for two-way communications (Block 700). Configuration information is provided from the control terminal to a remote terminal to configure the remote terminal to receive electronic content transmitted by the network access point over the established communication link (Block 705). The electronic content is received without providing responsive communications to the network access point from the remote terminal. The wireless local network access point may be, for example, a WiFi standard server.

Figure 8:
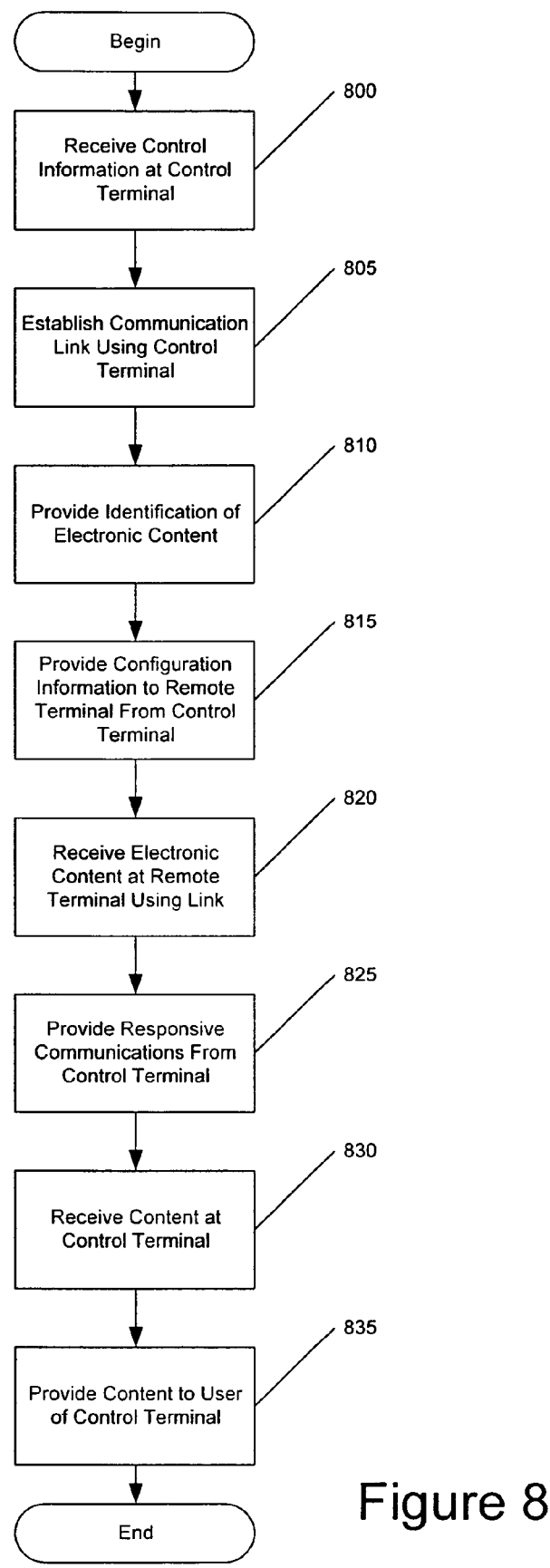

Yet further embodiments of operations for delivering electronic content to a remote terminal according to the present invention will now be described with reference to the flow chart illustration of FIG. 8. As shown for the embodiments of FIG. 8, control information is received from a user at a control terminal (Block 800). Communications are exchanged with a network access point from the control terminal, based on the control information, to establish a communication link configured for two-way communication (Block 805). An identification of a desired electronic content for transmission over the established link is provided to the network access point from the control terminal (Block 810). In addition, configuration information is provided from the control terminal to a remote terminal(s) to configure the remote terminal (or terminals) to receive the electronic content transmitted by the network access point (Block 815).

Electronic content transmitted by the network access point is received at the remote terminal(s) over the established communication link (Block 820). The electronic content is received without providing responsive communications to the network access point from the remote terminal(s). For the embodiments illustrated in FIG. 8, responsive communications are provided from the control terminal to the network access point to maintain the established communication link (Block 825). For example, the control terminal may provide acknowledgment of receipt of data packets, responses to polling queries or the like specified under the standard communication protocol associated with the network access point as requirements for maintaining the two-way communication link. Also shown in the embodiments of FIG. 8 is a receipt of the electronic content at the control terminal (Block 830). The received content may be provided from the control terminal to a control user/operator of the control terminal (Block 835). In other embodiments of the present invention, the data received at the control terminal is discarded at Block 835.

Figure 9:
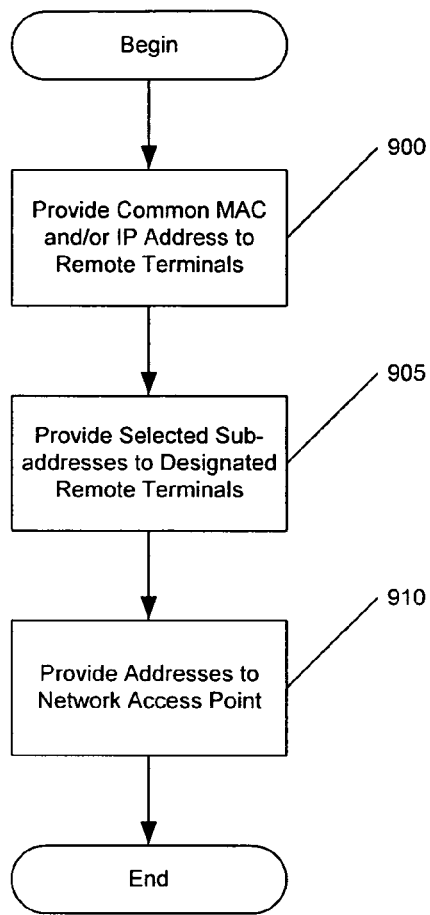

Operations for delivering electronic content according to further embodiments of the present invention will now be described with reference to the flow chart illustration of FIG. 9. As shown in the embodiments of FIG. 9, a plurality of remote terminals are utilized and configured in a manner that may allow receipt of different electronic content by respective ones of the remote terminals over a two-way communication link established by a control terminal. For the particular embodiments illustrated in FIG. 9, a common media access control (MAC) address and/or Internet protocol (IP) address associated with desired electronic content is provided to the plurality of remote terminals from the control terminal (Block 900). In addition, a sub-address associated with electronic content that will be embedded in the electronic content is sent to the plurality or remote terminals from the control terminal (Block 905).

In particular, when different electronic content is to be delivered to respective ones of the remote terminals, one or more of the remote terminals is provided a sub-address different from that provided to one or more other of the remote terminals to as to provide different electronic content to respective ones of the remote terminals. In addition, the MAC address and/or EP address and sub-address information may be provided from the control terminal to the network access point to be associated by the network access point or content server with the electronic content to be delivered (Block 910).

Figure 10:
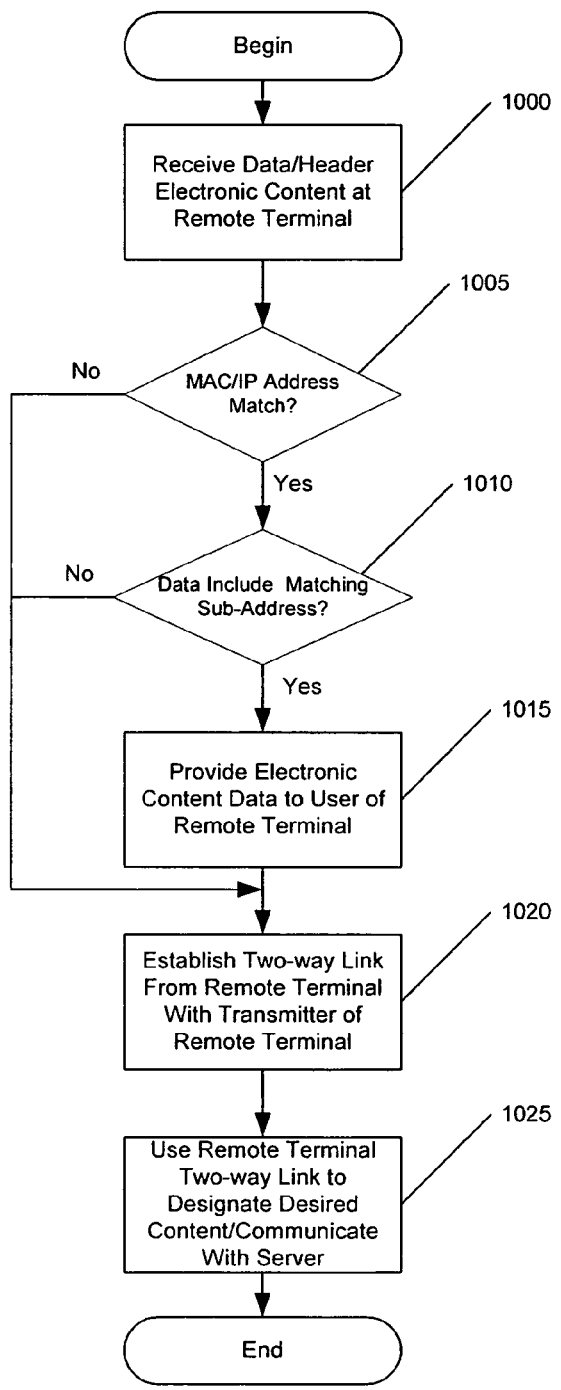

Yet further embodiments of the present invention will now be described with reference to the flow chart illustration of FIG. 10. More particularly, the flow chart illustration of FIG. 10 illustrates embodiments of operations carried out at a remote terminal and receiving electronic content over a two-way communication link established by a control terminal with a network access point. A remote terminal receives communications (such as packets) having data and a header associated with the data (Block 1000). The header may include addressing information, such as a MAC and/or IP address, and the communications are received by the remote terminal over the two-way communication link established by the control terminal. The remote terminal determines if the received MAC and/or IP address corresponds to a MAC and/or IP address associated with a desired electronic content (Block 1005).

For the embodiments illustrated in FIG. 10, sub-addresses are used as well as the header based MAC and/or IP address information. Accordingly, in the illustrated embodiments of FIG. 10, the remote terminal also determines if the data portion of the communication includes a sub-address associated with the desired electronic content (Block 1010) when a MAC/IP address match is found (Block 1005). If the header address and data embedded address information matches that associated with a desired electronic content, the received communication is provided by the remote terminal to a content user communicatively coupled to the remote terminal (Block 1015).

Further aspects that may be included in some embodiments of the present invention are also illustrated in FIG. 10 that may be found in some embodiments where the remote terminal is a two-way communication device including both a receiver and a transmitter. In such instances, a two-way communication link may be established directly between the remote terminal and the access point without use of the control terminal or between the remote terminal and the control terminal with the remote terminal acting as a two-way communication device setting up a two-way communication link to the control terminal itself (Block 1020). The two-way communication link established utilizing the two-way communication capabilities of the remote terminal may be used to receive electronic content directly or, in some embodiments, to provide a designation of the desired electronic content to the access point or control terminal from the remote terminal (Block 1025) and then subsequently to receive all the electronic content utilizing the one-way communication mode described previously.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed is:

1. A method of delivering electronic content, the method comprising:
    exchanging communications with a network access point from a control terminal to establish a communication link configured for two-way communications; and
    receiving electronic content transmitted by the network access point at a remote terminal over the established communication link without providing responsive communications to the network access point from the remote terminal.

2. The method of claim 1 wherein the network access point comprises a wireless local network access point.

3. The method of claim 1, further comprising:
    providing configuration information from the control terminal to the remote terminal to configure the remote terminal to receive the electronic content transmitted by the network access point.

4. The method of claim 3 wherein providing configuration information comprises providing a media access control (MAC) address and/or internet protocol (IP) address associated with the electronic content to the remote terminal from the control terminal.

5. The method of claim 4 further comprising providing the MAC address and/or IP address from the control terminal to the network access point to be associated with the electronic content.

6. The method of claim 4 wherein providing configuration information further comprises providing a sub-address associated with the electronic content that will be embedded in the electronic content to the remote terminal from the control terminal.

7. The method of claim 6 wherein receiving electronic content comprises the following performed by the remote terminal:
    receiving communications having data and a header including a MAC and/or IP address over the establish communication link;
    determining if the received MAC and/or IP address corresponds to the MAC address associated with the electronic content;
    determining if the data includes the sub-address associated with the electronic content if the received MAC and/or IP address corresponds to the MAC address associated with the electronic content; and providing the received communications to a content user communicatively coupled to the remote terminal if the data includes the sub-address associated with the electronic content and if the received MAC and/or IP address corresponds to the MAC address associated with the electronic content.

8. The method of claim 4 wherein the remote terminal includes a MAC layer having a reduced functionality relative to a standard MAC layer associated with establishing the communication link.

9. The method of claim 4 wherein the remote terminal is configured to receive communications from the control terminal having a non-standard communication protocol not provided by a standard used for the established communication link and wherein providing control information from the control terminal comprises providing the control information using the non-standard communication protocol.

10. The method of claim 9 wherein providing control information using the non-standard communication protocol comprises transmitting the MAC address and/or IP address preceded by a predefined data pattern not appearing in the electronic content.

11. The method of claim 3 wherein providing configuration information comprises transmitting the configuration information from the control terminal to the network access point using the established communication link.

12. The method of claim 11 wherein transmitting the configuration information comprises including the configuration information in data transmitted from the control terminal to the network access point.

13. The method of claim 12 wherein transmitting the configuration information further comprises preceding the configuration information in the data transmitted from the control terminal by a predefined data pattern recognizable by the remote terminal.

14. The method of claim 1 further comprising:
providing responsive communications from the control terminal to the network access point to maintain the established communication link.

15. The method of claim 1 further comprising:
providing an identification of a desired electronic content for transmission over the established link to the network access point from the control terminal.

16. The method of claim 1 further comprising:
receiving control information from a user at the control terminal, the control information being used to establish the communication link.

17. The method of claim 1 further comprising:
receiving the electronic content at the control terminal; and
providing the received content from the control terminal to a user from the control terminal.

18. The method of claim 1 wherein the remote terminal comprises a plurality of remote terminals.

19. The method of claim 18 wherein providing configuration information comprises:
providing a common media access control (MAC) address and/or internet protocol (IP) address associated with the electronic content to the plurality of remote terminals from the control terminal; and
providing a sub-address associated with the electronic content that will be embedded in the electronic content to the plurality of remote terminals from the control terminal, wherein at least one of the remote terminals is provided a sub-address different from another of the remote terminals to provide different electronic content to ones of the remote terminals.

20. The method of claim 1 wherein the remote terminal comprises a two-way communication device including a receiver and a transmitter and wherein the method further comprises establishing a two-way communication link between the remote terminal and at least one of the control terminal and/or the network access point and utilizing the established two-way communication link from the remote terminal to provide a designation of desired electronic content.

21. The method of claim 1 wherein the remote terminal comprises a two-way communication device including a receiver and a transmitter and wherein the method further comprises establishing a two-way communication link from the remote terminal to a content server through the network access point without use of the control terminal.

22. The method of claim 2 wherein the wireless local network access point comprises a WiFi standard server.

23. A method of delivering electronic content, the method comprising:
exchanging communications with a wireless local network access point from a control terminal to establish a communication link configured for two-way communications; and
providing configuration information from the control terminal to a remote terminal to configure the remote terminal to receive electronic content transmitted by the network access point over the established communication link without providing responsive communications to the network access point from the remote terminal.

24. The method of claim 23 wherein providing configuration information comprises providing a media access control (MAC) address and/or internet protocol (IP) address associated with the electronic content to the remote terminal from the control terminal.

25. The method of claim 24 wherein providing configuration information further comprises providing a sub-address associated with the electronic content that will be embedded in the electronic content to the remote terminal from the control terminal.

26. The method of claim 23 further comprising:
providing responsive communications from the control terminal to the network access point to maintain the established communication link.

27. An apparatus for delivering electronic content, the apparatus comprising:
means for exchanging communications with a wireless local network access point from a control terminal to establish a communication link configured for two-way communications; and
means for providing configuration information from the control terminal to a remote terminal to configure the remote terminal to receive electronic content transmitted by the network access point over the established communication link without providing responsive communications to the network access point from the remote terminal.

28. An apparatus for delivering electronic content, the apparatus comprising:
means for exchanging communications with a network access point from a control terminal to establish a communication link configured for two-way communications; and
means for receiving electronic content transmitted by the network access point at a remote terminal over the established communication link without providing responsive communications to the network access point from the remote terminal.

29. A computer program product for delivering electronic content, the computer program product comprising:

a non-transitory computer-readable storage medium having computer-readable program code embodied in said medium, said computer-readable program code comprising:

program code configured to exchange communications with a wireless local network access point from a control terminal to establish a communication link configured for two-way communications; and program code configured to provide configuration information from the control terminal to a remote terminal to configure the remote terminal to receive electronic content transmitted by the network access point over the established communication link without providing responsive communications to the network access point from the remote terminal.

30. A computer program product for delivering electronic content, the computer program product comprising:

a non-transitory computer-readable storage medium having computer-readable program code embodied in said medium, said computer-readable program code comprising:

program code configured to exchange communications with a wireless local network access point from a control terminal to establish a communication link configured for two-way communications; and program code configured to receive electronic content transmitted by the network access point at a remote terminal over the established communication link without providing responsive communications to the network access point from the remote terminal.

* * * * *